Dec. 5, 1961   J. F. McGLYNN   3,011,337
APPARATUS FOR DETERMINING THE FLASH POINT OF PETROLEUM PRODUCTS
Filed Aug. 18, 1958   4 Sheets-Sheet 4

INVENTOR
JAMES F. McGLYNN
BY
*Myron J. Burkhard*
ATTORNEY

United States Patent Office 3,011,337
Patented Dec. 5, 1961

3,011,337
APPARATUS FOR DETERMINING THE FLASH POINT OF PETROLEUM PRODUCTS
James F. McGlynn, Hollis, N.Y., assignor to Socony Mobil Oil Company, Inc., a corporation of New York
Filed Aug. 18, 1958, Ser. No. 755,741
7 Claims. (Cl. 73—36)

This invention relates to apparatus for determining the flash point of petroleum products and more particularly to apparatus for automatically performing this test while sensing and recording the change in temperature of the sample and indicating on the record the temperature at which flash occurred.

Among prior art methods and apparatus known are those accepted as standard by the American Society for Testing Materials, one being the Cleveland open cup method and another the Pensky-Martens method. Although accepted as standards by the A.S.T.M., both of these methods require the constant attention of an operator and are subject to criticism in that when the test is conducted in a lighted area it is difficult for the operator to detect by vision when flash first occurs.

The instant invention overcomes the above objectionable features of the known methods and apparatus in that it is entirely automatic in its operation. Heat is automatically supplied to the sample undergoing test at a selected uniform rate until the temperature of the sample has been raised to within approximately 100° F. of the flash point at which time the rate of supplying heat to the sample is automatically reduced to a predetermined value and supplied at the new rate until flash occurs. Means are provided for electronically detecting the flash and causing a recorder to indicate the temperature at which flash occured.

Therefore, the primary object of this invention is to provide apparatus for automatically determining the flash point of petroleum products and indicating this point on a permanent record. Another object of the invention is to provide a novel test cup which is a modification of the Cleveland open cup. Still another object of this invention is to provide electronic means for detecting flash when it occurs. This invention also contemplates electronic means which are operable when flash is detected for recording and indicating the temperature at which flash occurred. It is also an object of this invention to provide novel means for controlling the rates at which heat is applied to the sample undergoing test. A still further object of this invention is to provide electronic means operable by the rate of change of temperature of the sample undergoing test for controlling the heat supplied to the sample. A further object of this invention resides in the provision of electronic means for continually sensing the instantaneous temperature of the sample undergoing test and making a permanent record of temperature versus time. Other objects and advantages of the present invention will become apparent from the following detailed description when considered with the drawings in which:

Figure 1:
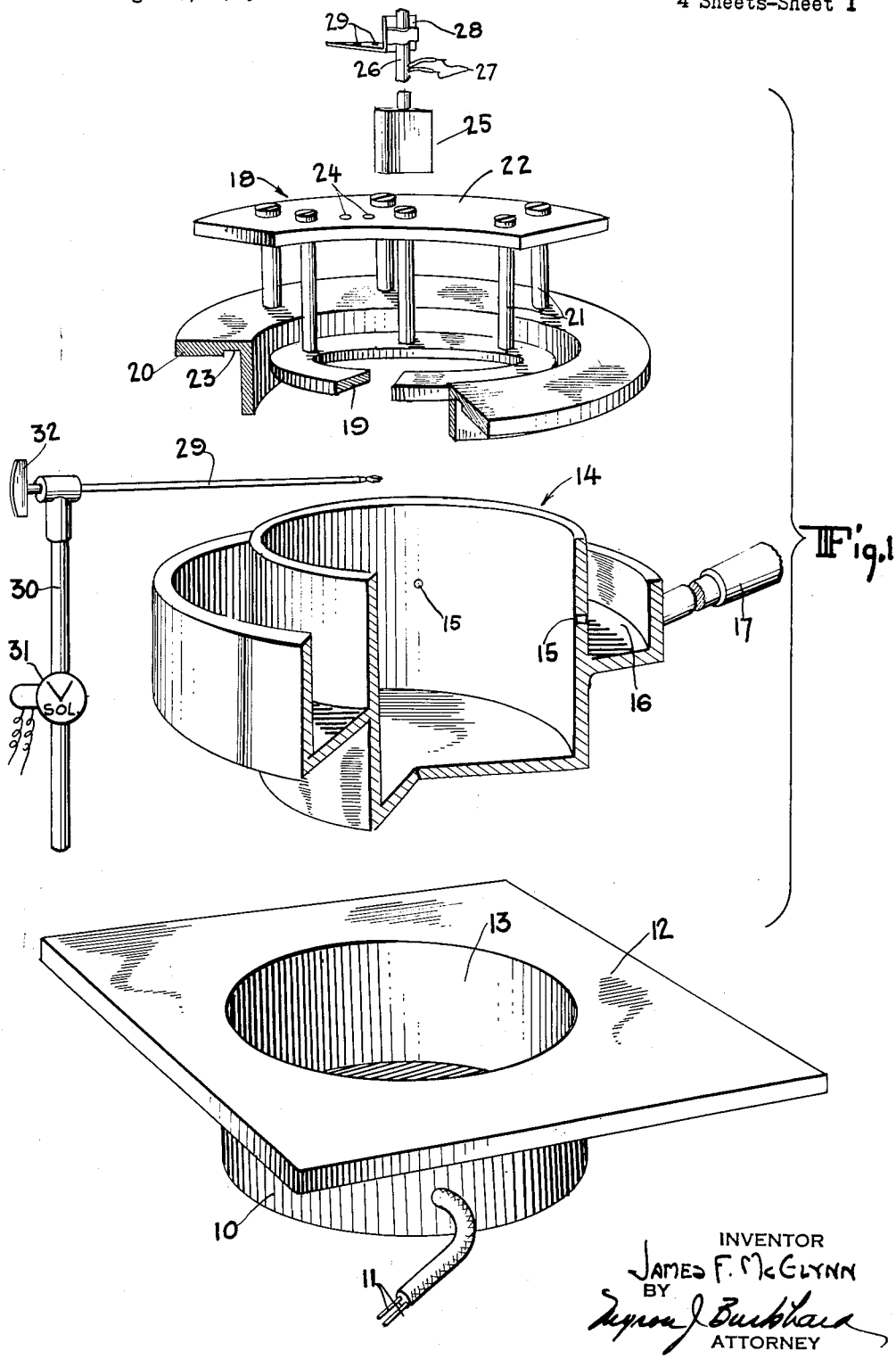
FIGURE 1 is a perspective exploded view partly in fragmentary section, showing the heating unit, modified Cleveland open cup, flash detection means, rate of change of temperature sensing device, and instantaneous temperature detection means.
Figure 2:
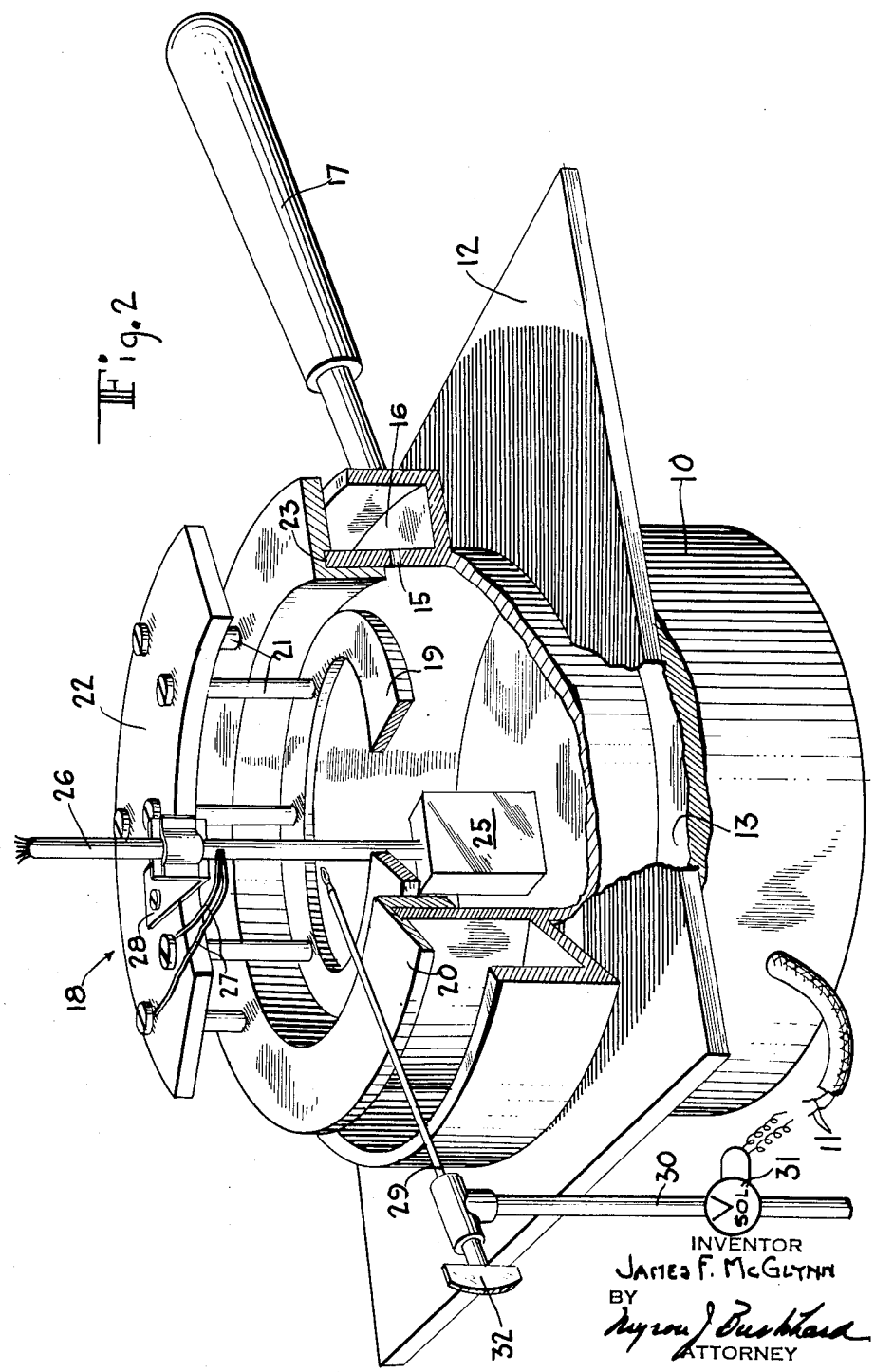
FIGURE 2 is an assembly view of the apparatus shown in FIGURE 1, partly in fragmentary section, showing the apparatus in operative condition.

Referring to the drawings in detail, particularly FIGURES 1 and 2, there is shown a heating unit 10 provided with conductors 11 by means of which heat is supplied to the enclosed heating element. The manner of supplying current to the conductors 11 will be described later as the description progresses. Heating unit 10 has mounted thereon a bed plate 12 having a recess 13 formed in the approximate center thereof. Recess 13 is adapted to receive the bottom of the sample container 14. Sample container 14, formed of a suitable metal such as copper or brass, has the same volumetric dimensions as the standard Cleveland open cup but differs therefrom in that passageways in the form of small holes 15 are formed in the wall thereof, to allow the liquid sample to spill from the cup when it expands while being heated. These holes are spaced 90° apart around the wall of the container and are positioned approximately one thirty second of an inch above the fill line. It is important to the operation of the instant invention that the level of the liquid sample with respect to the top of the container 14 be kept constant. The reason for this will become apparent as the description proceeds. Liquid flowing through the passageways 15 spills into the annular reservoir 16 which is formed around the outer wall of the sample container. The reservoir defining means may be welded to the external wall of the cup or made integral with it. For convenience in handling the sample container, a handle 17 is provided. Handle 17 may be secured to the bottom of the annular reservoir as by welding.

There is shown in FIGURE 1 immediately above the sample container 14 a flash detector 18. Detector 18 comprises two concentrically spaced rings 19 and 20. Rings 19 and 20 may be formed of copper, brass or any other suitable electrically conducting metal. These rings, by means of standoff supports 21, are carried by a supporting plate 22 made of any suitable electrical insulating material. A phenolic condensation product such as that known commercially by the trade name "Bakelite" has been found to be suitable. The bottom of ring 20 has formed therein an annular groove 23 which serves as a seat for the detector assembly when it is placed in operative position on the top of sample container 14 in the manner shown in FIGURE 2. The insulating support 22 is provided with holes 24 for mounting the temperature sensing and measuring device 25.

Device 25 is adapted to be submerged in the liquid sample undergoing test. It is made up of a resistance element whose resistance varies in a known manner with change in temperature and a thermocouple of conventional design. These elements are provided with electrical conductors which are enclosed within the sheath of cable 26. Additional conductors 27 are also carried by the cable 26 for making connection to the flash detector rings 19 and 20 in the manner shown in FIGURE 2. Device 25 is provided with a mounting bracket 28 having holes 29 which register with holes 24 on the insulating support so that the bracket can be fastened thereto by means of screws in a conventional manner.

A test flame is supplied by the burner 29 that is connected to a gas supply conduit 30. Gas supply conduit 30 is provided with a solenoid operated valve 31 whose operation is controlled in a manner to be described later.

Burner 29 is also equipped with a shut-off valve 32 that is adapted to be operated by hand. The burner is secured to the conduit 30 in such a manner that it can be rotated in a horizontal plane about the vertical axis of the gas conduit 30 to bring the flame into position over the sample undergoing test.

The manner in which heat is supplied to the sample at controlled rates; the flash is detected; and the instantaneous temperature of the sample is detected and recorded with respect to time will now be described with reference to the schematic wiring diagram of FIGURE 3. Conventional alternating current power is supplied to the system by the mains 33 through the switch 34. When switch 34 is closed the flash detection circuit and the heating rate control circuit are conditioned for operation when the test cycle is started.

Power is supplied to the flash detector system from the power main 33 through the switch 34 and the primary of transformer 35. Transformer 35 is provided with two secondary windings, one a high voltage winding and the other a low voltage winding. The high voltage winding by means of the full wave rectifier tube 36 supplies a high D.C. voltage, of the order of 320 volts, to the high voltage main 37. This voltage is regulated by a gas diode 38 in series with a variable resistance 39. The series combination is connected between main 37 and ground. Main 37 leads through a voltage dropping resistance 40, of the order of 4.7 megohms, to the inner ring 19 of the flame detector. The outer ring 20 of the flame detector is connected through a parallel combination of a variable resistor 41 and condensor 42 to the ground main 43. High voltage main 37 also supplies the direct current voltages to the plates of the double triode tube 44. The right hand side of the double triode operates as an amplifier while the left hand portion operates as a vacuum relay. Plate potential is applied to the plate of the amplifier portion of tube 44 through the resistance 45 and conductor 46. Plate potential is supplied to the plate of the vacuum relay portion of tube 44 by means of conductor 47, the winding of relay 48, the resistor 49, and conductor 50. The voltage bias on the grid of the amplifier portion of tube 44 is provided by the variable resistor 41, which, in turn, is provided with a leak condenser 42. The bias on the amplifier portion of tube 44 is normally sufficiently negative that the tube is in a non-conducting state. The bias voltage applied to the grid of the relay portion of tube 44 is supplied through the resistor 51 in conjunction with the cathode bias resistor 52. (Cathode bias resistor 52 comprises three resistance banks, any one of which may be selected to arrive at proper sensitivity for the flame detector, which varies with temperature and design. Resistors in this array will be selected according to the characteristics of a particular instrument, and selection for sensitivity will be made on basis of test temperature levels.) The grid of the vacuum tube relay portion is so biased that it is normally in a conducting state.

To operate this instrument, after oil to be tested is placed in the flash cup, starting switch 59 is closed, establishing continuity from line voltage supply 33 (switch 34 also being closed at this time). Current from conductors 55 and 56 passes through the coil of latch relay 60. Latch relays 60 and 58 comprise a dual double pole, double throw set up, the relay 60 component of which supplies current through conductors 61 and 62 to the heater assembly, and also, through conductors 63 and 64, permits recording potentiometer 65 to observe and record the temperature of the oil in the flash cup as observed by thermocouple 66 which is housed in device 25 (of FIGURES 1 and 2).

When current flows through conductors 61 and 62, relay 67 (which closed at start of operation), acts to close relay 68 permitting current to flow from 110 volt source 33 through conductors 69 and 70 to energize the heating unit 10. A pilot light is supplied in this circuit to indicate heater is operating.

When current flows through conductors 61 and 62, timing motor 71 (30 minutes per revolution), is energized. This motor is utilized in a manner later shown to vary the potential arrangements in bridge circuit 73. Varying potential in 73, governed by motion of motor 71, is designed to permit raising the temperature of the oil under test at a first rate of 25–30° F. per minute up to 100° F. below expected flash point. Resistance 74 of bridge 73 is embedded in device 25 (FIGURES 1 and 2) and its value varies with the temperature of the oil being tested. Motor 71, driving contacts upon the other three elements of bridge 73, sets up a timed pattern of resistances for resistance 74 to balance.

If 74 is in balance (rate of heating correct), bridge 73 is in balance, no current flows between base and emitter of transistor 75, triode 76 permits flow of current to maintain relay 67 closed and heater 10 in operation. If 74 is out of balance due to low rate of heating, the same conditions prevail. If 74 is out of balance due to high rate of heating, current flowing in transistor 75, due to this lack of balance, changes grid bias of gas triode 76, stopping flow of current therethrough, opening relay 67, and stopping application of heat until bridge 73 is again in balance.

Bridge 73 is supplied with rectified current of limited voltage through conductors 77 and 78 from rectifier 79, supplied in turn through conductors 80 and 81 from transformer 35.

Figure 4:
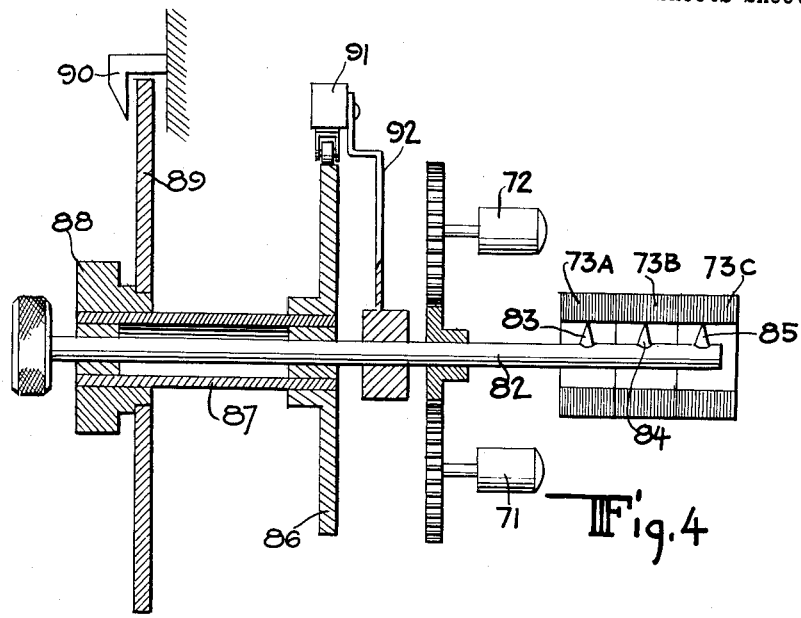
FIGURE 4 is a highly diagrammatic view of the apparatus for adjusting and controlling the rate at which heat is supplied to the sample undergoing test.

Turning to FIGURE 4, there is shown diagrammatically a set up of the motors resistances and other arrangements for control of timed rate of heating.

Figure 3:
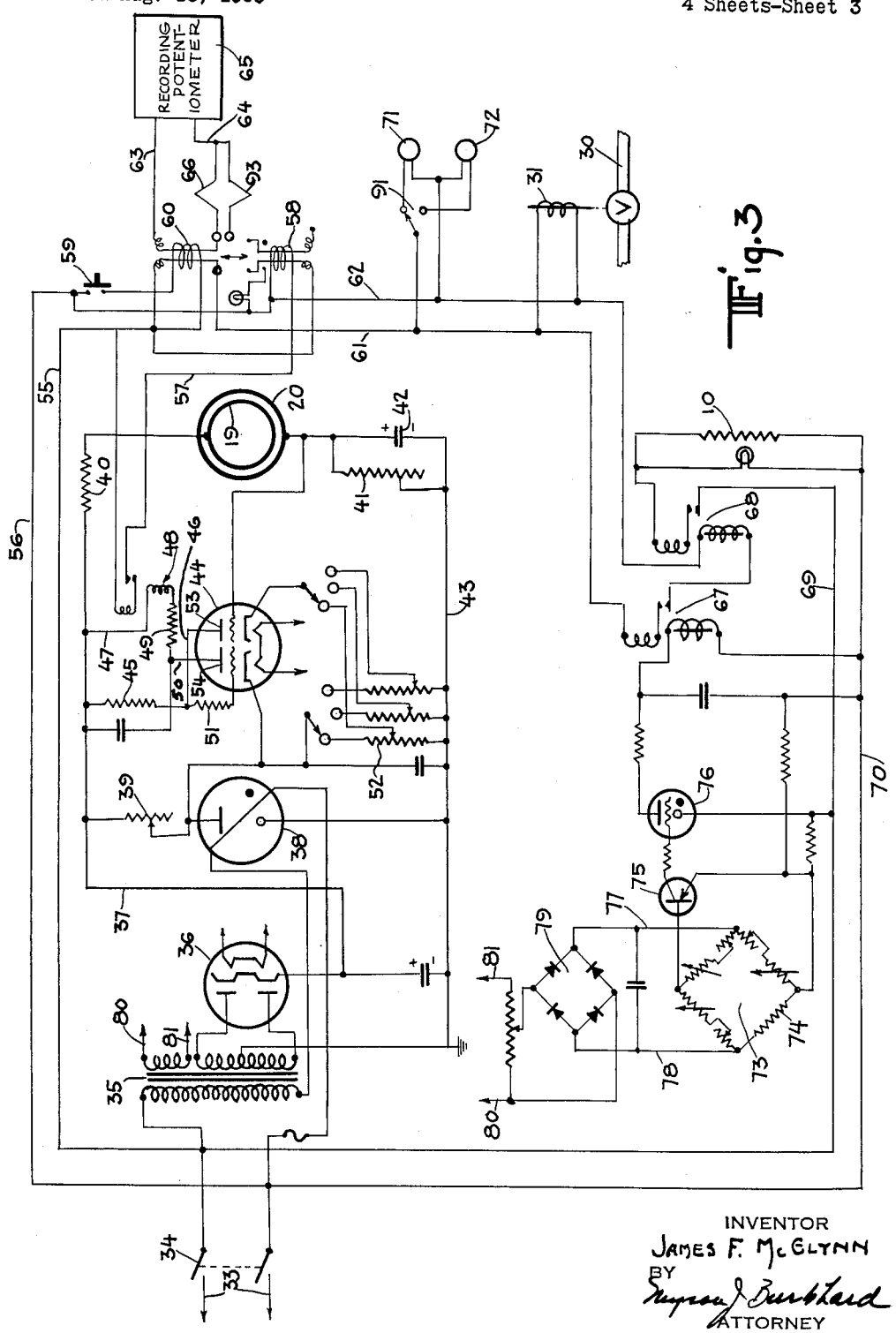
FIGURE 3 is a schematic wiring diagram of the electronic circuitry used to render the apparatus entirely automatic.

A central shaft 82 carries contacts 83, 84, 85, which traverse elements 73A, 73B, 73C, which are the three variable resistances of bridge 73 (FIGURE 3). This shaft 82, at commencement of operation, is driven by motor 71 through a diagrammatically shown connection at a speed of 30 minutes per revolution for heating at the high rate, and contacts 83, 84, 85, are moved relatively over their resistances. A cam 86, set at the beginning of the operation by manual adjustment, through tube 87 (to which 86 is secured), knob 88 and calibration dial 89 to a temperature about 100° F. below expected flash point (against positioning pointer 90), is contacted with a microswitch 91 carried by arm 92 mounted in fixed position on shaft 82.

Figure 5:
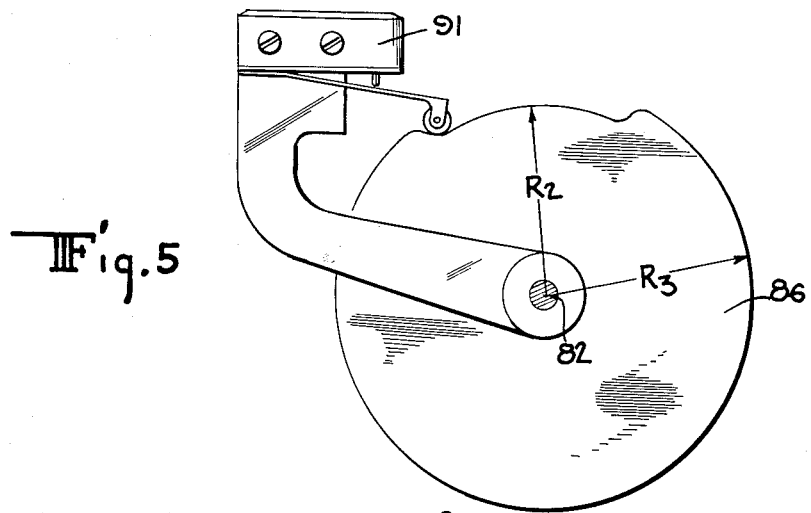
FIGURE 5 is a view of the cam and associated microswitch shown in FIGURE 4.

For understanding of this cam, we turn to FIGURE 5. Cam 86 is arranged with radius $R_3$ through most of its circumference, this radius being sufficient to maintain microswitch in closed position for motor 71. The remainder is of radius $R_2$ permitting microswitch 91 to disconnect motor 71 and operate motor 72.

Returning to FIGURE 4, motor 72, which is one revolution per 90 minutes, is shown diagrammatically to be connected to shaft 82, driving contacts 83, 84, 85 at a slower rate, and, consequently heating the oil, as required by test method, at a lower rate.

Flash test is by test probe 29, as explained in FIGURE 1, and this continuously provides a small flame of specified size positioned at a specified point above the cup. As long as conductors 61 and 62 (FIGURE 3) are carrying current, relay 31 maintains valve 30 open to supply this flame.

Normally relay 48 is in open position. When flash occurs in the area of the cup between flame detector elements 19 and 20, the ionization due to flash permits change in potential on the grid in the amplifier section (right hand section), of double triode tube 44, allowing current to flow to plate 53, which in turn, acting through conductor 46 and resistance 51, changes the grid bias upon the relay section of tube 44, cutting off current to plate 54 and allowing the closing of relay 48.

When 48 closes, current, supplied by conductors 55 and 56 from the 110 volt source 33, flows from conductor 55, through closed relay 48, conductor 57, and the coil of latch relay 58. Latch relay 58 acts to stop the operation of the instrument in the following manner.

The contacts surrounding element 60 of the latch relay are opened, stopping recording of recording potentiometer 65, and de-energizing equipment items supplied with current through conductors 61 and 62.

When recording potentiometer 65 is cut out by action of the element 60, this is effected by switching it from observation of thermocouple 66 (which is in the oil under test) to observation of couple 93, which is at room temperature.

Figure 6:
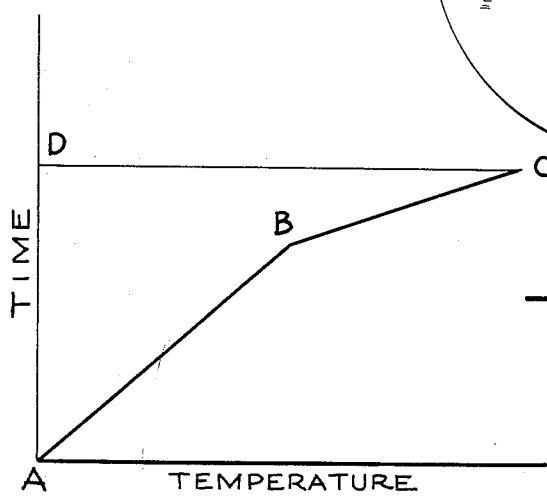
FIGURE 6 is a curve of the type that is drawn by the recorder with temperature as abscissa and time as ordinates showing the rate of change of temperature of the sample up to the temperature at which flash occurs.

FIGURE 6 shows a typical curve of test drawn by recording potentiometer 65. The horizontal coordinate is temperature. The vertical one is time. Portion AB of the curve shows the temperature during the high-rate-of-rise period. Portion BC shows that the rate of application of heat is restricted as the expected flash point is approached. At C, the highest point, the actual flash point is observed, and CD records the stoppage of observation of oil temperature and return of the recording instrument to ambient temperature.

I claim:

1. A system for determining the flash point of liquid petroleum products that comprises in combination a batch sample container of specified volume, a heating unit for heating a batch sample in said container, means responsive to the rate of change of temperature of the sample for controlling the rate of heating, means for sensing and recording the temperature of said sample at short intervals of time, means for igniting vapors accumulated above the surface of the sample and produced by heating the sample, means carried by said container for detecting the flash produced on ignition of said vapors by producing an electrical signal coincident therewith, and means responsive to said electrical signal for indicating the temperature at which flash occurred.

2. A system for determining the flash point of liquid petroleum products that comprises in combination a batch sample container of specified volume, a heating unit for heating a batch sample in said container, means disposed within the sample responsive to the rate of change of temperature of the sample for controlling the rate of heating said sample, means for measuring the temperature of said sample, means for igniting vapors accumulated above the surface of the sample and produced by heating the sample, means carried by said container for detecting the flash produced on ignition of said vapors by producing an electrical signal coincident therewith, and means responsive to said electrical signal for indicating the temperature at which flash occurred.

3. A system for determining the flash point of liquid petroleum products that comprises in combination a batch sample container of specified volume, a heating unit for heating a batch sample in said container, means disposed within the sample responsive to the rate of change of temperature of the sample for controlling the rate of heating said sample, means for sensing and recording the temperature of said sample at short intervals of time, means for igniting vapors accumulated above the surface of the sample and produced by heating the sample, means carried by said container for detecting the flash produced on ignition of said vapors by producing an electrical signal coincident therewith, and means responsive to said electrical signal for indicating on the record the temperature at which flash occurred.

4. A system for determining the flash point of liquid petroleum products that comprises in combination a batch sample container, a heating unit for heating a batch sample in said container of specified volume, means responsive to the rate of change of temperature of the sample for automatically maintaining a fixed rate of heating of said sample to a temperature that is approximately 100° F. below the flash point temperature and for maintaining a reduced rate of heating the sample until flash point occurs, means for measuring the temperature of said sample, means for igniting vapors accumulated above the surface of the sample and produced by heating the sample, means carried by said container for detecting the flash produced on ignition of said vapors by producing an electrical signal coincident therewith, and means responsive to said electrical signal for indicating the temperature at which flash occurred.

5. A system for determining the flash point of liquid petroleum products that comprises in combination a batch sample container of specified volume, a heating unit for heating a batch sample in said container, means responsive to the rate of change of temperature of the sample for automatically maintaining a fixed rate of heating of said sample to a temperature that is approximately 100° F. below the flash point temperature and for maintaining a reduced rate of heating the sample until flash point occurs, means for sensing and recording the temperature of said sample, means for igniting vapors accumulated above the surface of the sample and produced by heating the sample, means carried by said container for detecting the flash produced on ignition of said vapors by producing an electrical signal coincident therewith, and means responsive to said electrical signal for indicating on the record the temperature at which flash occurred.

6. A system for determining the flash point of liquid petroleum products that comprises in combination a batch sample container of specified volume, a heating unit for heating a batch sample in said container, means responsive to the rate of change of temperature of the sample for maintaining the rate of heating said sample at between 25 and 50° F. per minute until the temperature has risen to within approximately 100° F. of the flash point, means rendered operative by said last recited means for maintaining the rate of heating said sample at 10 to 12° F. per minute during approximately the 100° F. preceding the flash point temperature, means for sensing and recording the temperature of said sample, means for igniting vapors accumulated above the surface of the sample and produced by heating the sample, means for detecting the flash produced by igniting said vapors by producing an electrical signal coincident therewith, and means responsive to said electrical signal for indicating on the record the temperature at which flash occurred.

7. A system for determining the flash point of petroleum products that comprises in combination a batch sample container of specified volume, a heating unit for heating a batch sample in said container, means for maintaining the rate of heating said sample at between 25 and 50° F. per minute until the temperature has risen to within approximately 100° F. of the flash point, means rendered operative by said last recited means for maintaining the rate of heating said sample at 10 to 12° F. per minute during approximately the 100° F. preceding the flash point temperature, means for measuring the temperature of said sample, means for igniting vapors accumulated above the surface of the sample and produced by heating the sample, means for detecting the flash produced by igniting said vapors by producing an electrical signal coincident therewith, and means responsive to said electrical signal for indicating the temperature at which flash occurred, rendering inoperative the heating means and the rate of heating control means.

References Cited in the file of this patent

UNITED STATES PATENTS

| | | |
|---|---|---|
| 788,250 | Courtois | Apr. 25, 1905 |
| 1,941,182 | Mizuta et al. | Dec. 26, 1933 |
| 2,746,285 | Greanias | May 22, 1956 |
| 2,815,428 | Pearce | Dec. 3, 1957 |

UNITED STATES PATENT OFFICE
CERTIFICATE OF CORRECTION

Patent No. 3,011,337                          December 5, 1961

James F. McGlynn

It is hereby certified that error appears in the above numbered patent requiring correction and that the said Letters Patent should read as corrected below.

Column 5, line 69, strike out "of specified volume" and insert the same after "container" in line 68, same column 5.

Signed and sealed this 17th day of July 1962.

(SEAL)
Attest:

ERNEST W. SWIDER
Attesting Officer

DAVID L. LADD
Commissioner of Patents